Patented May 20, 1941

2,242,223

UNITED STATES PATENT OFFICE 2,242,223

SURFACE WETTING AGENT AND PROCESS OF MAKING IT

Rudolph S. Bley, Elizabethton, Tenn., assignor to North American Rayon Corporation, New York, N. Y., a corporation of Delaware No Drawing. Application November 30, 1937, Serial No. 177,385

7 Claims. (Cl. 260—251)

The present invention relates to a process of producing surface-active wetting agents and the products thereof.

One object of this invention is to provide for a process of producing a wetting agent, carrying in the cation at least one group inducing surface-activity, by condensing a halogenated material containing at least one hydrocarbon having a chain of eight or more carbon atoms selected from the group consisting of crude petroleums, gasolines, kerosenes, lubricating oils, pasty petrolatums, liquid petrolatums and paraffin waxes with a tertiary base selected from the group consisting of amines, phosphines, arsines and stibines under substantially anhydrous conditions, said agent capable of furnishing ions in an ionizing medium.

Another object of this invention is to provide for a process of producing a cation-active wetting agent by condensing a halogenated paraffin wax with a tertiary base selected from the group consisting of amines, phosphines, arsines and stibines under substantially anhydrous conditions.

A further object of this invention is to provide for a process of producing a cation-active wetting agent by condensing a halogenated paraffin wax with an aliphatic, carbocyclic or heterocyclic tertiary base selected from the group consisting of amines, phosphines, arsines and stibines under substantially anhydrous conditions, said agent being capable of furnishing ions in an ionizing medium while being stable therein.

Other objects of my invention will become apparent to those skilled in the art from a study of the following specification.

I am well aware that so-called "onium" compounds have, heretofore, been prepared by condensing a tertiary base with an alkyl halide containing eight or more carbon atoms to form surface-active wetting agents, for example lauryl-trimethyl-ammonium bromide, lauryl-pyridonium sulphate, cetyl-methyl-diethyl-ammonium hydroxide, cetyl-pyridonium chloride, etc. However, it has been found in actual practice that such quaternary ammonium bases and salts are very expensive chemicals due to the difficulties involved in the production of high-molecular alcohols, such as, lauryl alcohol, octyl alcohol, cetyl alcohol, etc., these alcohols being essential raw materials for the production of the aforementioned wetting agents. Furthermore, since it is necessary to convert these alcohols into alkyl halides—this conversion being expensive and resulting in poor yields—before the condensation with tertiary bases can be achieved, the production costs of such wetting agents has so far prevented their extended use in various chemical arts.

By experimentation, I have unexpectedly found that cation-active wetting agents may be produced by a simple and inexpensive condensation process comprising heating a halogenated, hydrocarbonaceous material at a relatively low temperature with a tertiary base selected from the group consisting of amines, phosphines, arsines and stibines.

Materials, such as pasty petrolatums, liquid petrolatums and paraffin waxes were originally obtained from tars from the distillation of wood, peat, and lignite, but are now obtained mainly from petroleum, and especially from Pennsylvania paraffin-base oils. Little information is available about the composition of paraffin waxes except that it consists mainly of higher alkanes and only small amounts of the normal compounds. Petrolatum is a pasty mixture of hydrocarbons similar to paraffin while liquid petrolatum is a high boiling petroleum distillate. Ozokerite is a natural paraffin wax originating in Galicia; in bleached form it is termed "ceresin." Solid and liquid petrolatum, paraffin waxes obtained during the distillation of petroleum, ozokerite and ceresin may be halogenated in conventional manner in the presence or absence of catalysts to form halogenated compounds adapted to be condensed with tertiary bases in accordance with my present invention. These raw materials may be first dissolved and/or dispersed in carbon tetrachloride, etc., and subsequently chlorine, bromine, etc., in gaseous form introduced therein until the heat of reaction abates. Halogenated compounds, containing about 25 to 40% of a halogen may be obtained in this manner. However, upon prolonging the introduction of halogens, compounds may be obtained containing up to about 75% of a halogen, and it is to be noted that the boiling or fusing points of the raw materials are either lowered or raised by halogenation, and hydrochloric acid, hydrobromic acid, etc., formed during this reaction must be removed preferably by neutralization. Catalysts, such as iron, etc., may be added to the mixtures to accelerate halogenation. Halogenation will also proceed more rapidly by carrying out the reaction under the influence of ultra-violet rays. The halogenation may also be performed in accordance with processes disclosed, for example, in U. S. Patent #989,225 to Blakeman April 11, 1911; U. S. Patent #1,191,916 to Brooks of July 18, 1916; U. S. Patent #1,246,810 to Ellis of November 13, 1917; U. S. Patent #1,432,761 to Koch of October 24, 1922; etc. Chlorinated paraffin, sold under the tradename of "Chlorafin" is also a suitable raw material in my process.

Tertiary bases, capable of being condensed with a halogenated material selected from the group consisting of pasty petrolatums, liquid petrolatums and paraffin waxes, are for example: Trialkyl amines, amines having two aliphatic radicals and one aromatic radical (dialkyl-aryl-amines), amines having one aliphatic radical and two aromatic radicals (alkyl-diaryl amines), triaryl amines, pyridine, substituted pyridines, pyridazine, pyrazine, triazole, oxazole, tetrazole, quinoline, substituted quinolines, acridine, substituted acridines, phenanthridine, phenanthrolines, phenazine, picoline, substituted picolines, trialkyl phosphines, dialkyl-aryl phosphines, alkyl-diaryl phosphines, triaryl phosphines, trialkyl arsines, dialkyl-aryl arsines, alkyl-diaryl arsines, triaryl arsines, trialkyl stibines, dialkyl-aryl stibines, alkyl-diaryl stibines, triaryl stibines, etc. Dialkyl sulphides, alkyl-aryl sulphides and diaryl sulphides may be condensed with halogenated paraffins to form cation-active sulphonium compounds suitable as wetting agents, etc.

The tertiary bases, set forth above, have the following general structure:

in which X represents nitrogen, phosphorus, arsenic and antimony, and $R_1$, $R_2$ and $R_3$ represent monovalent aliphatic or aromatic radicals directly linked to X. If X becomes part of a heterocyclic ring as exemplified by pyridine, picoline, etc., the tertiary base has the structure:

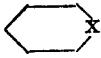

Thus, the wetting agents prepared in accordance with the present invention have probably the structures:

(1) 

and (2) 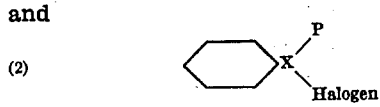

in which P represents a hydrocarbon chain having 8 or more carbon atoms contained in a halogenated material selected from the group consisting of crude petroleums, gasolines, kerosenes, lubricating oils, pasty petrolatums, liquid petrolatums and paraffin waxes, X represents nitrogen, phosphorus, arsenic or antimony, and $R_1$, $R_2$ and $R_3$ represent monovalent aliphatic or monovalent aromatic radicals directly linked to X.

Example 1

About 150 grams of triethanolamine are heated with about 30 grams of a chlorinated paraffin (Chlorafin) under reflux for about 12 hours at a temperature of about 90° C. The reaction is completed when the light yellow color of the mixture has turned to a dark, red-brown color and foaming subsides. Upon cooling, the products of reaction solidify to a soft, highly viscous mass which foams in the presence of alkalis and acids without decomposition. The raw product may be purified by extraction, etc., although it may be used in an impure form for commercial purposes. The cation-activity of the product originates from a number of hydrocarbon chains having eight or more carbon atoms directly linked to nitrogen atoms. The free base may be isolated from the chloride in well known manner with moist silver oxide. Inert solvents, such as benzene, ether, chlorinated aromatic hydrocarbons, such as carbon tetrachloride, etc. may be used to dissolve the bases and halogenated petroleum hydrocarbons before these compounds are condensed. This process may be carried out with other halogenated petroleum hydrocarbons and tertiary bases, and the condensation may be carried out in vacuo.

Example 2

About 50 grams of a chlorinated paraffin were dissolved in about 500 ml. of anhydrous pyridine and the mixture refluxed for 10 to 24 hours at a temperature of about 50° C. The light yellow solution turns dark brown during refluxing. After removing excess pyridine by distillation and cooling, a dark-brown mass is obtained which foams in the presence of alkalis, acids and salts. Tertiary phosphines, arsines and stibines may replace this tertiary amine. Other halogenated paraffin waxes and halogenated petroleum hydrocarbons may replace chlorinated paraffin. The condensation may be carried out in vacuo and in the presence of inert solvents.

Although these examples will serve to illustrate the present invention, I do not wish to be limited to the exact proportions, set forth above, which are typical combinations, as certain of these compounds may be omitted or replaced by others of similar nature, and the proportions within wide limits may be varied. In other words, while I have found that the halogenated materials and tertiary bases enumerated above give the desired results, I do not wish to be limited to the use of all of these compounds, to these compounds and no others, nor to the exact proportions and concentrations, set forth above, since a considerable variation of proportions and concentrations will not adversely affect the chemical and physical characteristics of the wetting agents resulting from such variations. The condensations may be carried out at any temperature at which the condensation products are not decomposed.

These novel surface-active compounds may be used in practically all processes or for any purpose where it is desirable to employ a detergent or a compound having wetting and penetrating power. They may be used in neutral, alkaline and acidic aqueous solutions and also in hard water, whereas many detergents are ineffective in one or more of such solutions. Silk, wool and other textile materials which are affected by alkaline solutions may be thoroughly cleansed in acidic solutions containing the novel agents. Cotton fibers and fabrics, threads and fabrics of regenerated cellulose may be cleansed with these detergents in alkaline solutions. These wetting agents may also be used in combination with other anion- or cation-active compounds, or with neutral, acid or basic salts, such as, for example, sodium sulphate, sodium chloride, disodium phosphate, sodium acetate, sodium bisulphate, and similar alkali metal and ammonium salts. They may be added to desulphurizing baths, mercerizing baths, pickling solutions, etc. They may be used as flotation agents, disinfectants, plasticizers, stripping agents for dyestuffs, agents for preventing bleeding of dyestuffs, emulsifiers, etc. These novel wetting agents may be admixed with viscose solutions and acid spin baths to prevent incrustation of the orifices of spinnerets used in the manufacture of regenerated cellulose. The term "halogenated" embraces chlorinated brominated, fluorinated and iodinated compounds, and I wish to include only such quaternary ammonium, phosphonium, arsonium and stibonium compounds which are sufficiently soluble to furnish ions in an ionizing medium.

Modifications of my invention will readily be recognized by those skilled in the art, and I desire to include all such modifications coming within the scope of the appended claims.

I claim:

1. The process of producing a surface-active wetting agent which comprises heating a halogenated paraffin wax with a tertiary amine below their boiling points under substantially anhydrous conditions.

2. The process of producing a surface-active wetting agent which comprises heating a chlorinated paraffin wax with a triethanol amine below their boiling points under substantially anhydrous conditions.

3. The process of producing a surface-active wetting agent which comprises heating a halogenated paraffin wax with a tertiary, aliphatic amine below their boiling points under substantially anhydrous conditions.

4. The process of producing a surface-active wetting agent which comprises heating a halogenated paraffin wax with a tertiary, heterocyclic amine, below their boiling points under substantially anhydrous conditions.

5. A surface-active wetting agent, the heat-reaction product of a halogenated paraffin wax and a tertiary amine.

6. A surface-active wetting agent, the heat-reaction product of a chlorinated paraffin wax and a tertiary, aliphatic amine.

7. A surface-active wetting agent, the heat-reaction product of a chlorinated paraffin wax and triethanolamine.

RUDOLPH S. BLEY.